United States Patent [19]

Barna et al.

[11] Patent Number: 5,492,336

[45] Date of Patent: Feb. 20, 1996

[54] O-RING GASKET MATERIAL AND METHOD FOR MAKING AND USING SAME

[75] Inventors: Eileen C. Barna, West Chester, Pa.; Elizabeth M. Hamilton; Eric W. Lalli, both of Elkton, Md.; Cindy B. Lubin, Towson, Md.; Wanda F. Sparks; Alfred F. Waterland, III, both of Elkton, Md.

[73] Assignee: W. L. Gore & Associates, Inc., Newark, Del.

[21] Appl. No.: 183,386

[22] Filed: Jan. 19, 1994

Related U.S. Application Data

[63] Continuation-in-part of Ser. No. 118,372, Sep. 8, 1993, which is a continuation-in-part of Ser. No. 50,903, Apr. 20, 1993.

[51] Int. Cl.⁶ .................................................. F16J 15/10
[52] U.S. Cl. ........................... 277/1; 277/227; 277/229
[58] Field of Search ................................. 277/227, 229, 277/230, 1

[56] References Cited

U.S. PATENT DOCUMENTS

| | | | |
|---|---|---|---|
| 2,459,721 | 1/1949 | Poltorak | 277/229 |
| 3,393,504 | 7/1968 | Dodge, Jr. | 57/144 |
| 3,756,004 | 9/1973 | Gore | 57/11 |
| 3,878,031 | 4/1975 | Dormer | 277/230 X |
| 3,953,566 | 4/1976 | Gore | 264/288 |
| 4,330,136 | 5/1982 | Henson | 277/299 X |
| 4,576,861 | 3/1986 | Kato | 428/316.6 |
| 4,743,421 | 5/1988 | McDowell et al. | 264/129 |
| 4,823,229 | 4/1989 | Waterland, III | 277/227 X |
| 4,898,638 | 2/1990 | Lugez | 156/272.6 |
| 5,072,952 | 12/1991 | Irrgeher et al. | 277/229 |
| 5,112,664 | 5/1992 | Waterland, III | 428/76 |
| 5,160,773 | 11/1992 | Sassa | 428/76 |

FOREIGN PATENT DOCUMENTS

| | | |
|---|---|---|
| 0159942 | 10/1985 | European Pat. Off. . |
| 0304141 | 2/1989 | European Pat. Off. . |
| 0415140 | 3/1991 | European Pat. Off. . |
| 47-62658 | 6/1972 | Japan . |
| 49-75565 | 7/1974 | Japan . |
| 55-072950 | 2/1980 | Japan . |
| 57-051450 | 3/1982 | Japan . |
| 59-115828 | 7/1984 | Japan . |
| 5099343 | 4/1993 | Japan . |
| 4331876 | 4/1993 | Japan . |
| 9104847 | 4/1991 | WIPO . |
| 9208916 | 5/1992 | WIPO . |
| 9304227 | 4/1993 | WIPO . |

OTHER PUBLICATIONS

Literature; INERTEX Valve Stem Packing Literature, Inertech Supply, Inc. date unknown Gore-Tex® Valve Stem Packing, W.L. Gore & Associates, Inc. 1989.
Literature: APV Model HXCB Paraglow Plate Heat Exchanger, 6 pages APV Crepaco, Inc., May, 1985.
Literature; Mueller® Accu-Therm® Plate Heat Exchangers, no date.

*Primary Examiner*—William A. Cuchlinski, Jr.
*Assistant Examiner*—John L. Beres
*Attorney, Agent, or Firm*—David J. Johns

[57] ABSTRACT

Improved O-ring gasket material and method for use in sealing various apparatus, such as fluid conduits for heat exchange apparatus, is provided. The gasket material comprises a cylindrical core of elongated polytetrafluoroethylene (PTFE) contained within a tight wrap of high strength film. The gasket material has the exceptional operational properties of PTFE, while being resistant to cold flow or "creep" which distorts most PTFE seals under heavy unconfined compression.

19 Claims, 2 Drawing Sheets

O-RING GASKET MATERIAL AND METHOD FOR MAKING AND USING SAME

RELATED APPLICATIONS

The present application is a continuation-in-part of U.S. patent application Ser. No. 118,372 filed Sep. 8, 1993, which is a continuation-in-part of U.S. patent application Ser. No. 050,903, filed Apr. 20, 1993.

BACKGROUND OF THE INVENTION

1. Field of the Invention

The present invention relates to gasket and seal materials, and especially gasket materials pre-formed into various shapes (e.g. an O-ring seal in O-ring groove flanges) for sealing an apparatus together to contain fluid flow therethrough, such as in a transformer radiator flange.

2. Description of Related Art

O-ring flanges are used frequently in the joining of piping or enclosures where a metal-to-metal contact between the components is required. In this flange design, a groove is machined into one flange face in such a way that a resilient elastomeric type gasket sits tight within it. The gasket and groove are designed so that ideal compression of the elastomeric gasket occurs with the two flanges brought together until they are contacting. With the two flanges contacting, there exists metal-to-metal contact of the flanges to allow for more of a load-bearing assembly, i.e., the metal flanges end up carrying the majority of the bolt load and external loads that may be exerted on this joint. In standard flat-face or raised-face flange designs, the flanges do not contact, and the entire bolt load and external load are carried by the gasket. The integrity of the joint is, thus, highly dependent on the gasket.

An example of one application of O-rings is in the radiator piping of large electric transformers. Transformers convert incoming voltage to either a higher or lower output voltage depending on its output. In the process, the transformers develop a significant amount of heat that must be continuously dissipated. The heat dissipation is typically accomplished through the use of special transformer oils which are circulated within the transformer and then cooled through externally-mounted, air-cooled radiators. For example, in a transformer converting 69 kV to 13 kV, heat transfer conditions require the use of about 6" diameter class 150 flanges and piping that connect to an externally mounted radiator and circulation pump. The design of the externally mounted radiator is such that it is hanging off the side of the transformer. As such, there is a tremendous bending moment applied to several of the flanges. The presence of this bending moment has compelled use of O-ring joint flanges that are better suited, structurally, to carry this type of load.

A typical transformer O-ring seal comprises a ring of elastomer or cork/elastomer (e.g. butyl rubber, neoprene, ethylene-propylene diene monomer (EPDM), etc.) that is sized (ID, OD & thick) to fit snug within the groove on one flange and stand above the groove by about 20–40% of the depth.

Existing elastomer or cork/elastomer gaskets have several drawbacks. For instance, a sometimes difficult compromise must be struck between a material which provides a tight seal and a material which is adequately durable and chemical/heat resistant for long-term use. Another common constraint is that existing gaskets are not always able to compensate for, misaligned, bent, corroded, or otherwise defective flange faces.

It is important that the flanges in O-ring groove flanges are kept in contact with each other during service. Such contact is important for external load carrying purposes. With the flanges contacting and the O-ring captured within the groove, there is no allowance for gasket creep or set. In this regard, the proper sizing and selection of the O-ring material is crucial. The gasket material must compress enough to develop and maintain enough counterforce to seal between the flanges when brought together; additionally, the O-ring material cannot cold flow or further compact with time, nor can it fracture under high loads.

Typically, elastomer or elastomer containing gasket materials are used as the seal in O-ring joint flanges as a material is needed that, once compressed, continues to exert a counterforce against the two flanges (i.e. exhibit resiliency) and, thus, maintains the seal. In applications such as transformer radiator flanges, cumulative thermal and chemical degradation of the elastomeric gasket while under compressive stress results in an inability of the gasket to maintain sufficient counterforce, thus resulting in premature leakage around the gasket. Materials such as elastomers are desired from the standpoint of resiliency and compressive counterforce, however, their long-term performance limitations when in the presence of elevated temperatures, ultraviolet radiation and transformer oils, make them less than ideal for applications such as transformer radiator flanges. What is required is a sealant that also exerts and maintains a compressive counterforce, yet is unaffected by thermal or chemical exposure.

One material that has superior heat and chemical resistant properties is polytetrafluoroethylene (PTFE). As a gasket, PTFE has exhibited utility as a material for use in harsh chemical environments which normally degrade many conventional metals, elastomers, and polymeric materials. Conventional, full density PTFE has a usable temperature range from as high as 260° C. to as low as near −273° C.

However, conventional non-porous PTFE gasket materials which have been compression molded or extruded and then heated to a temperature above 345° C. exhibit poor mechanical properties, such as low tensile strength and low cold flow resistance. This limits or excludes the use of such materials in these applications requiring long term resistance to creep.

PTFE may be produced in an expanded porous form as taught in U.S. Pat. No. 3,953,566 issued Apr. 27, 1976, to Gore. Expanded polytetrafluoroethylene (ePTFE) is of a higher strength than conventional PTFE, has the chemical inertness of conventional PTFE, and has an increased temperature range of up to 315° C. in service. An example of a porous expanded PTFE gasket material is available from W. L. Gore & Associates, Inc., of Elkton, Md., under the trademark GORE-TEX\ Joint Sealant.

Although polytetrafluoroethylene (PTFE) can provide the necessary durability, its tendency to experience compressive creep renders this material problematic as well. PTFE gaskets (virgin, filled or expanded) all exhibit varying degrees of compressive creep or flow. With metal-to-metal contact of the flanges in an O-ring joint flange, there is no mechanism for compensating for even a slight amount of creep. If the gasket creeps and, as a result, becomes thinner, there is no longer a counterforce being exerted by the gasket against the flanges.

One suggestion for achieving the chemical resistance of PTFE but limiting the amount of creep of the material is to coat a generally creep-stable material such as synthetic rubber with a coating of PTFE to provide chemical resistance. One example of such a structure is presented in U.S. Pat. No. 4,898,638 issued Feb. 6, 1990, to Lugez. In this patent it is taught that through a disclosed process one or more films of only partially porous PTFE can be adhered to a rubber sheet to provide a gasket material with chemical resistance. While this approach may address some of the problems with existing O-ring materials, the PTFE film can crack under the stresses of compression, leading to exposure and failure of the core elastomer. Further, it is believed that longer life and better thermal and chemical resistivity are possible if an expanded PTFE material is employed throughout the O-ring.

As is disclosed in co-pending United States patent application Ser. No. 050,903, filed Apr. 20, 1993, it has been determined that a PTFE sealing material can be produced with limited long-term creep by wrapping a core of elongated or expanded PTFE with a high strength film of expanded PTFE. The high strength film is resistant to deformation and stretching and serves to contain the PTFE core in place within a compressed gasket. This material has proven to be quite effective in sealing plate and frame heat exchangers—providing thermal and chemical protection, long-life and durability, and ease in replacement. However, it is believed that with modifications such material may be useful in other sealing environments.

Accordingly, it is a primary purpose of the present invention to provide a gasket material for an O-ring groove flange apparatus that provides an effective long-term seal under pressure, while being durable, chemical and thermal resistant, non-contaminating, and easy to install.

It is still another purpose of the present invention to provide a gasket material for O-ring groove flanges that provide the benefits of PTFE or expanded PTFE material, while avoiding the problem of creep.

It is a further purpose of the present invention to provide a method for making and optimally using a gasket material with the above properties.

These and other purposes of the present invention will become evident from review of the following specification.

SUMMARY OF THE INVENTION

The present invention is an improved gasket material for use in a variety of flange arrangements including O-ring groove flanges, such as transformer radiator piping. The basic material of the present invention comprises a core of polytetrafluoroethylene (PTFE) tightly wrapped in a high strength film. When placed under compression in an O-ring groove flange, the gasket material of the present invention has proven to be highly resistant to cold flow or "creep," while providing all the exceptional properties of PTFE material.

The preferred gasket material of the present invention comprises an elongated or expanded PTFE core wrapped in a high strength PTFE film and pre-compressed to vastly reduce the amount of compression required to install the gasket material between pipe flanges. Alternatively, the core may be pre-compressed and then wrapped to provide the improved properties of the present invention.

The gasket material of the present invention has numerous benefits over previous O-ring flange sealing material. Among the improvements are longer life and greater long term durability in environments of harsh chemicals and/or extreme temperatures and temperature cycling.

DESCRIPTION OF THE DRAWINGS

The operation of the present invention should become apparent from the following description when considered in conjunction with the accompanying drawings, in which.

DETAILED DESCRIPTION OF THE INVENTION

The present invention is a gasket material suitable for use in a variety of applications, and especially in applications requiring minimal cold flow or "creep." Of particular interest are O-ring groove flanges (e.g., transformer radiator piping) where they are used to seal transformer oils and support the weight of the piping system and accessories.

Since these types of flanges and their O-ring grooves come in a very wide variety of sizes, it should be understood that considerable customizing of gasket material may have to be performed to fit gaskets to different flange styles and sizes. Fortunately, as will be evident from the following description, the gasket material of the present invention is fully adaptable to such customizing. As used herein, the term "O-ring" is intended to encompass any gasket which is molded or otherwise formed into a joined or continuous ring of whatever circumferential shape or cross-sectional shape, primarily designed for, but not limited to, fitting within a groove on the flange faces. Other beneficial uses of the present invention include as a sealant on flat face or raised face flanges, and in O-ring groove flanges where there is no metal to metal contact of the flanges.

Figure 1:
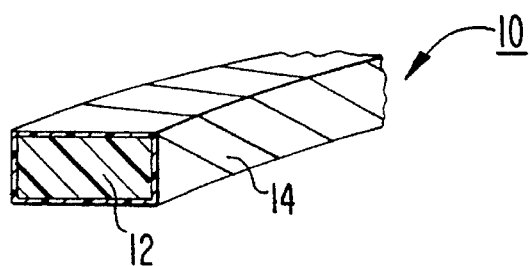
FIG. 1 is a three-quarter isometric view of cord gasket material of the present invention.

Shown in FIG. 1 is a cord 10 of material of the present invention comprising a PTFE core material 12 wrapped in a film 14. The cord 10 has been compressed into a rectangular shape suitable for many gasketing applications.

Preferably, the core material is prepared by paste extrusion of PTFE fine powder to form a rod or beading by methods and equipment known in the art. The paste extruded rod or beading is then expanded to form a flexible porous structure of nodes lo interconnected by fibrils by stretching it according to the process taught in U.S. Pat. No. 3,953,566 to Gore. The paste extruded PTFE rod or beading is stretched in the longitudinal direction an amount in the range 2:1 to 25:1, preferably an amount in the range 3:1 to 12:1, depending on the strength and compressibility properties desired in the core material. The core can be calendered before wrapping in order to maintain the compressibility of the outer wraps to aid in sealing.

Prior to wrapping, the elongated porous PTFE core material has a surface shape that permits the film to be wrapped in continuous contact with the surface of the core material. For use as a gasket, preferably, the elongated porous PTFE core material is wrapped in a circular cross-section and then the wrapped material is molded, calendered, or otherwise compressed to establish a rectangular cross-section for installation and to optimize initial thickness, density and compressibility. Alternatively, the core may also be wrapped in virtually any shape having no recessed surfaces (e.g. rectangular, oval, square, triangular, etc.). More complex shapes, e.g., surfaces with depressions or projections, can be formed after the core material has been wrapped.

While expanded PTFE core material is preferred in the present invention, it should be appreciated that beneficial results may likewise be realized through wrapping many forms of PTFE material so as to reduce its cold flow properties. As such, improved performance through use of the present invention may also be possible by wrapping unexpanded PTFE extrudate, filled PTFE, or PTFE tapes. The term "elongated" PTFE as used herein should be read to include all such applications.

In all forms of the present invention the gasket material may be provided in a variety of forms to solve specific sealing needs. FIG. 1 illustrates a cord gasket material, with typical dimensions of 12.7 mm wide, 7.6 mm thick. The cord gasket material can be provided in continuous lengths, such as on a spool, to allow it to be cut to size for particular installation demands.

Figure 2:
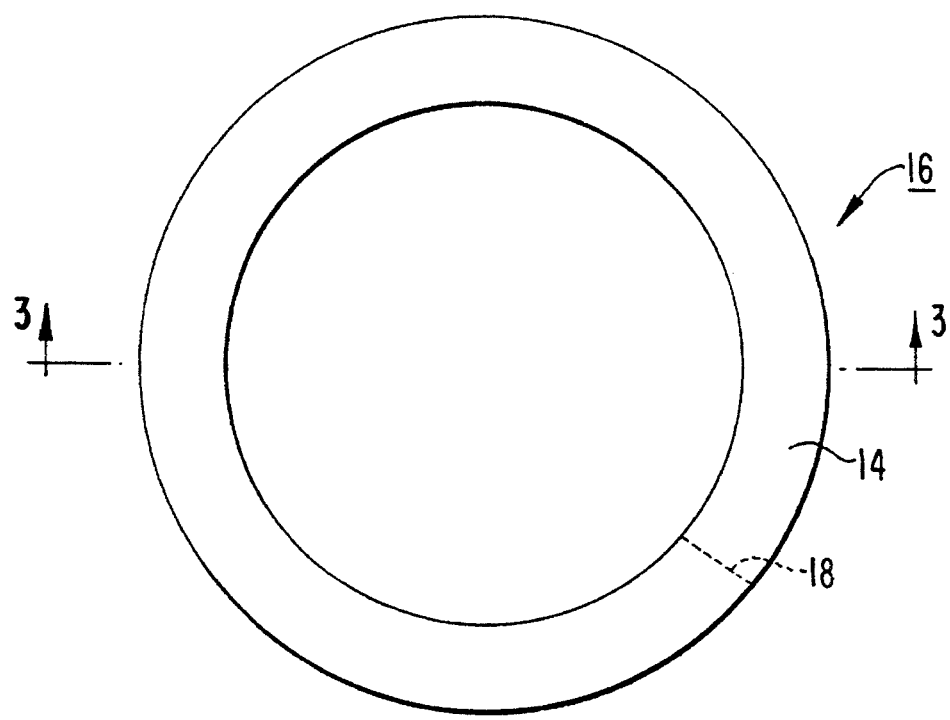
FIG. 2 is a top plan view of the cord gasket material of the present invention formed into a continuous loop.
Figure 3:
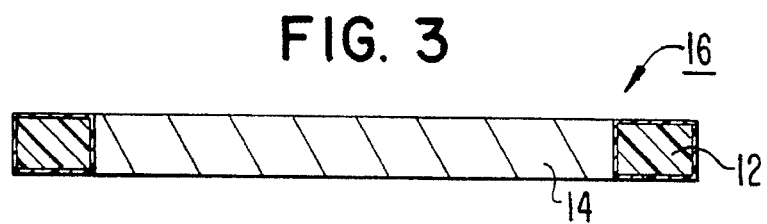
FIG. 3 is a cross-sectional view along line 3—3 of FIG. 2.

While the cord can be cut to provide specialized sealing, for most O-ring groove flanges the cord gasket material is joined to itself to form a continuous loop gasket 16 like that shown in FIGS. 2 and 3. A joint 18 is then connected together by simply splicing the ends. One such splicing technique comprises cutting the ends with a 1 inch minimum scive cut, joining the ends together, wrapping the joined ends with a tape (which ideally should be similar or identical to the film wrapping the gasket material), and then heat setting the tape in place with a mold press.

The flexibility of the PTFE core and the resistance of the gasket material to cold flow allows the loop of gasket material to be shaped and retained in various positions for installation in an O-ring groove flange apparatus. One such shaped position is shown in FIGS. 4 and 5.

Figure 4:
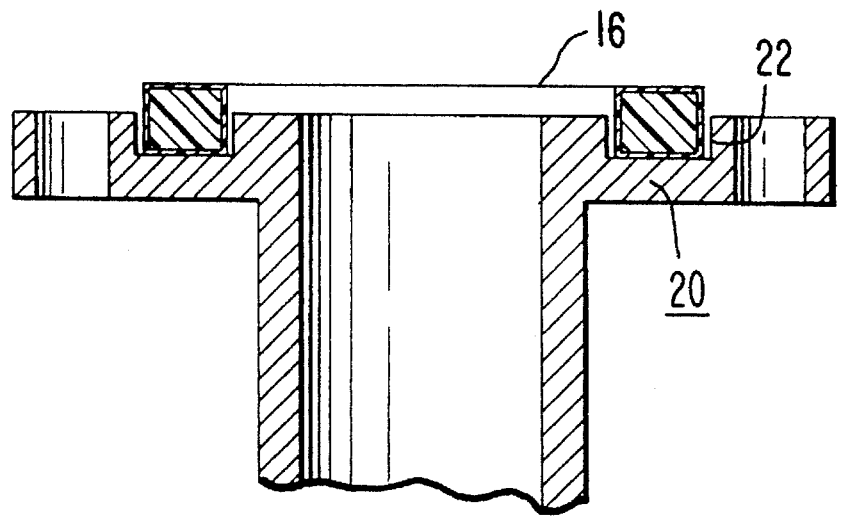
FIG. 4 is a cross-sectional view of the gasket material of the present invention positioned within an O-ring groove.
Figure 5:
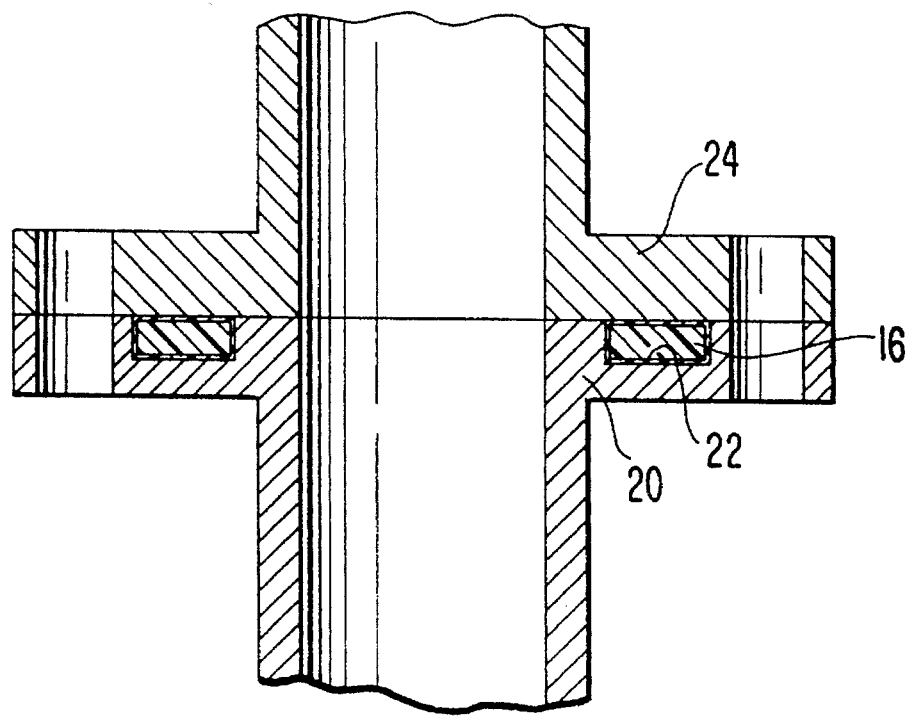
FIG. 5 is a cross-sectional view of the gasket material of the present invention positioned within an O-ring groove and compressed against an opposing flange.

FIG. 4 shows a conventional circular flange 20 having a groove 22 formed therein. Prior to sealing, the gasket 16 sits loosely within the groove 22, its thickness being approximately 2–3 times the depth of the groove. A typical O-ring groove flange application of this form may comprise a 6" nominal inside diameter (I.D.) flange with a 8⅜" outside diameter (O.D.) and a 7" I.D. groove cut into one flange. Groove depth is about ⅛". As is shown in FIG. 5, once an opposing flange member 24 is compressed against the flange 20, the gasket 16 compresses and seals against the opposing flange member 24 and spreads out to completely fill the groove 22.

The elongated PTFE core may contain a particulate filler. The term "particulate" is meant to include particles of any aspect ratio and thus includes particles, chopped fibers, whiskers, and the like. The particulate filler may be an inorganic filler which includes metals, semi-metals, metal oxides, carbon, graphite, and glass. Alternatively, the particulate filler may be an organic filler, which includes polymeric resins. Suitable resins include, for example, polyether ether ketone (PEEK), fluorinated ethylene propylene (FEP), copolymer of tetrafluoroethylene and perfluoro(propylvinyl ether)(PFA), and other similar high melting polymers.

Particulate fillers, when used, are selected to impart or enhance certain properties in the core or wrapping film according to the application in which the composite gasket material of the invention will be used. For example, they can be used to impart or lo enhance properties such as electrical conductivity and thermal conductivity, and can also be used to modify compressibility and dimensional stability properties of the composite gasket material. Particulate fillers can be used in concentrations as high as 90 volume percent, but are more generally used in the concentration range 10–70 volume percent.

The particulate filler and PTFE fine powder may be combined using conventional dry mixing methods after which they can be formed to provide the core material of the invention by the process taught in U.S. Pat. No. 3,953,566 to Gore. Alternatively, the particulate filler may be mixed with PTFE in aqueous dispersion and coagulated together to form a wet mixture of solids. The water is removed from the mixture by standard drying methods and the mixture further processed in the same manner as dry mixed materials.

The high strength film wrap is preferably a porous expanded PTFE film as produced by the process taught in U.S. Pat. No. 3,953,566 to Gore. By stretching a paste-formed PTFE sheet in one or more directions, a porous expanded polytetrafluoroethylene film having high strength is produced. The high strength porous PTFE film may be made by stretching uniaxially, either in longitudinal or transverse direction; or biaxially, in both longitudinal and transverse directions, sequentially or simultaneously. The film is preferably uniaxially stretched in the longitudinal direction an amount in the range 2:1 to 150:1, more preferably an amount in the range 2:1 to 80:1.

Longitudinal direction as used herein indicates the planar direction of manufacture of the film; transverse direction indicates the planar direction normal to the direction of manufacture.

For the previously mentioned transformer application, the preferred gasket material comprises an expanded PTFE with a density of 1.2 g/cc (within a range of 1.0 to 1.4 g/cc) after being wrapped and shaped, which has general pre-installed dimensions of about 8.1 mm by 11.7 mm in cross section. The ring is formed to an inside diameter of about 181 mm by an outside diameter of about 207 mm. The O-ring initial thickness, density, and inside and outside diameters are selected such that when installed and the flanges are lo brought together, the sealant compresses to fill the groove and reaches a density in the preferred range of 1.6 to 2.2 g/cc.

For this use, a four layer film is used comprising three inner films and an outer film coaxially wrapped around the core. Prior to installation on the core, the preferred inner films are about 2 mil thick and about 1 inch wide, and have a tensile strength of 212.7 MPa and a modulus of elasticity at 2% strain of about 7212 MPa; the preferred outer film is about 6 mil thick and 1.5 inches wide, and has a tensile strength of about 19.9 MPa and a modulus of elasticity at 2% strain of about 590 MPa.

To assist in retaining this gasket material in place once installed, it is preferred that a thin coating of adhesive 24 be applied to the gasket material and/or the groove 22 in the flange. The ideal adhesive comprises a composite adhesive material comprising a pressure sensitive adhesive layer (e.g. rubber or acrylic) applied to either side of a woven or non-woven carrier sheet (e.g. MYLAR® polyester). The choice of adhesive is application specific and depends upon the chemical and temperature conditions under which the gasket is to be employed. The adhesive should have good holding properties against both expanded PTFE and metal.

Ideally, the high strength PTFE film is a composite film comprising a high strength porous expanded PTFE film adhered to a thin layer of melt-processible thermoplastic fluoropolymer. By thin is meant a thickness of 30 micrometers or less, preferably 20 micrometers or less, and more preferably 10 micrometers or less. The expanded layered composite film is produced in the following manner.

PTFE fine powder, which may be combined with the same particulate filler materials and prepared as described above, is mixed with a hydrocarbon extrusion aid, usually an odorless mineral spirit, to form a paste. The paste is compressed into a billet and subsequently extruded through a die in a ram-type extruder to form a coherent planar sheet. The coherent PTFE sheet, with or without particulate filler materials, is optionally calendered and then dried by volatilizing the hydrocarbon extrusion aid with heat. Evaporation of the hydrocarbon extrusion aid results in the PTFE lo sheet having a small degree of porosity. The resulting porous PTFE sheet is now ready to be combined with a melt-processible thermoplastic fluoropolymer film and the combined sheets expanded together. However, if a highly porous expanded PTFE film is desired, the porous PTFE sheet may be preliminarily expanded by stretching it at 200–300° C. about 1.5 to 5 times its original length prior to combining it with the melt-processible thermoplastic fluoropolymer.

The porous PTFE sheet is combined with the melt-processible thermoplastic fluoropolymer film by placing the melt-processible film on the porous PTFE sheet and heating the combination to a temperature between the melt point of the melt-processible fluoropolymer and 365° C. The porous PTFE sheet is kept under tension when heated thereby maintaining its dimensions while the melt-processible fluoropolymer layer is combined with it. As the porous PTFE sheet is heated to a temperature above the melt point of the melt-processible fluoropolymer layer, the melt-processible fluoropolymer layer in contact with the porous PTFE sheet at least partially melts and flows onto the surface of the porous PTFE sheet thereby forming a composite precursor, i.e., a coated porous PTFE sheet ready to be expanded.

The coated porous PTFE sheet may be expanded according to the method taught in U.S. Pat. No. 3,953,566 to Gore. The temperature range at which expansion of the coated porous PTFE sheet is performed is between a temperature at or above the melt point of the melt-processible thermoplastic fluoropolymer layer and a temperature at or below the melt point of PTFE. The coated porous PTFE sheet may be stretched uniaxially, either in a longitudinal or transverse direction; or biaxially, in both longitudinal and transverse directions, sequentially or simultaneously. It may be stretched in one or more steps.

The coated porous PTFE sheet forms a porous expanded PTFE film as it is stretched. The expanded PTFE film is characterized by a series of nodes interconnected by fibrils. As the coated porous PTFE sheet is expanded to form the high strength porous expanded PTFE film, the melt-processible thermoplastic fluoropolymer layer adhered to it is carried along the surface of the expanding sheet while in a melted state, thereby becoming progressively thinner and lo forming a thin melt-processible thermoplastic fluoropolymer layer on the porous expanded PTFE sheet. The thin melt-processible fluoropolymer layer has a thickness of 30 micrometers or less. The thin melt-processible fluoropolymer layer preferably has a thickness of one half, more preferably one tenth, of the thermoplastic fluoropolymer film's original thickness. For example, a thermoplastic fluoropolymer film originally having a thickness of 25.4 micrometers (1 mil) could produce a thin thermoplastic fluoropolymer layer having a thickness as low as about 2.5 micrometers (0.1 mil) or less after expansion of the porous PTFE sheet into the porous expanded PTFE article.

The means for heating the porous expanded PTFE sheet may be any means for heating commonly known in the art including, but not limited to, a convection heat source, a radiant heat source or a conduction heat source. The conduction heat source may be a heated surface such as a heated drum, roll, curved plate, or die. When a conduction heat source is used as the means for heating the coated porous expanded PTFE sheet, the uncoated surface of the sheet should be against the conduction heat source so to prevent sticking and melting of the melt-processible fluoropolymer layer upon the conduction heat source..

Thermoplastic fluoropolymers which are of utility as the melt-processible thermoplastic fluoropolymer layer have melt points of 342° C. or less. They include copolymer of tetrafluoroethylene and hexafluoropropylene (FEP), copolymer of tetrafluoroethylene and perfluoro(propylvinyl ether) (PFA), homopolymers of polychlorotrifluoroethylene (PCTFE) and its copolymers with TFE or VF2, ethylene-chlorotrifluoroethylene (ECTFE) copolymer, ethylene-tetrafluoroethylene (ETFE), polyvinylidene fluoride (PVDF), and polyvinylfluoride (PVF). Thermoplastic fluoropolymers are preferred as the melt-processible thermoplastic fluoropolymer since they are similar in nature to PTFE, having melt points near the lowest crystalline melt point of PTFE, and therefore are relatively high temperature thermoplastic polymers. Thermoplastic fluoropolymers are also relatively inert in nature and therefore exhibit resistance to degradation from many chemicals.

When applied under sufficient temperature and/or pressure, the melt-processible thermoplastic fluoropolymer film can act as an lo adhesive to adhere the high strength porous expanded PTFE film to the surfaces of other materials.

The expanded layered composite film is wrapped on the core of elongated PTFE so that the thin layer of melt-processible thermoplastic fluoropolymer contacts the core of elongated polytetrafluoroethylene. The composite film layer is then heated to cause the thin layer of melt-processible thermoplastic fluoropolymer to at least partially melt and adhere to the core of elongated PTFE core.

The PTFE film may be wrapped on the core in any desired manner. For instance, the film can be wrapped on the core helically so that the film forms a helical seam on the composite gasket material. Alternatively, the high strength film may be wrapped on the core in a longitudinal manner so that the film forms a longitudinal seam on the composite gasket material.

While the film may be wrapped on the core by hand, it is preferred that the wrapping is accomplished through the use of high-speed mechanical wrapping apparatus, such as a conventional tape-wrap machine used to wrap dielectric tape layers on conductors. One such machine is disclosed in U.S. Pat. No. 3,756,004 to Gore. The tape wrap machine applies a degree of back tension to the high strength film as it wraps it in a helical fashion around the core which applies a compressive force to the core and thereby somewhat densifies the core in the process. The degree of back tension applied to the high strength film may be varied so that the density of the core and final dimensions of the assembly may also be varied. Ideally, a sufficiently tight wrap is applied so as to limit "creep" of the core material when placed under compressive force once installed.

Densification (i.e. reduction in porosity) of the core results in no change to the tensile strength or tensile modulus properties which were developed in it by the expansion process, however, densification has a substantial effect on the flex and compressive characteristics of the material. By partially densifying the core and then constraining it by wrapping it with the high strength film, control over the amount of deformation required to densify it fully when in service can be exercised. In other words, a composite gasket material is produced such that a compressive load sufficient to provide an excellent seal can be applied to the composite gasket material with relatively little movement together of the sealing surfaces. Thus, the composite gasket material of the invention can provide and maintain a much thicker gasket that covers a much smaller sealing surface area than can be obtained from existing PTFE gasket materials having lower density or strength.

Alternatively, other means for densifying the expanded PTFE core can be used prior to the application of the high strength film to the PTFE core. Other means for densifying porous expanded polytetrafluoroethylene include compression by platen presses, grooved or flat calender rolls, and reducing or forming dies.

The high strength porous expanded PTFE film wrapped upon the elongated PTFE core imparts a substantially increased measure of circumferential strength and restraint to the PTFE core. The result is a composite gasket material with a reduced tendency to creep (i.e. a gasket material that has much greater resistance to becoming thinner and wider under steady compressive loads when compared to a PTFE gasket without the high strength wrap).

Alternatively, a second porous expanded PTFE film, which likewise may be coated with a melt-processible thermoplastic fluoropolymer as described above, may be wrapped upon the first high strength film. The second wrapped film can have tensile properties which provide additional strength and creep resistance to the composite gasket material or, alternatively, can have lower tensile strength and tensile modulus properties than the first wrapped film in order to enhance sealing surface conformability of the gasket material.

The following examples disclosing processes and products according to the present invention are illustrative only and are not intended to limit the scope of the present invention in any way.

TEST DESCRIPTIONS

TENSILE TEST

To determine the tensile properties of the high strength porous expanded polytetrafluoroethylene film, a 2.54 cm (1.0 inch) wide by 20.3 cm (8.0 inches) long sample of the film is obtained. Thickness of the film is determined with a snap micrometer gauge and width of the film is determined with a linear gauge. A constant rate-of-jaw-separation machine (Instron testing machine, Model 1122) is used to test samples to break. The gauge length of the specimen is 10.16 cm (4.0 inches). The strain rate employed is 2.54 cm/min (1.0 inch/min). Samples are tested to break. The tensile modulus at 2% extension and maximum stress are calculated and recorded as described in ASTM Standard Test Method D 882-91.

A population of five to eight samples is averaged to give each value listed herein.

GASKET FLOW TEST

Two sections of gasket material each 12.7 cm (5 inches) in length are obtained. The samples are mounted, in parallel alignment approximately 20 cm (8 inches) apart, between two 25.4 cm (10 inches) square rigid flat platens. An initial compressive load of 8.01 kN/linear cm (1800 lbf/linear in) is applied to the samples. The samples remain compressed for a period of 10 minutes at a temperature of 200° C. The compressive load is reduced by creep of the samples during the 10 minute compression period. No effort is made to maintain a constant load.

At the end of the compression period the samples are recovered and the distance around the perimeter ($P_f$) of the compressed sample is measured (in a direction perpendicular to the long axis of the sample). The $P_f$ measurement is compared to an initial perimeter measurement ($P_i$) of the sample taken in like manner prior to testing and the increase reported as Gasket Flow (GF) according to the formula:

$GF$, percent=$(P_f P_f /P_i) \times 100$

Example 1

A composite gasket material of the instant invention was produced in the following manner:

A 0.0127 mm (0.5 mil) FEP tape (50A available from E. I. dupont de Nemours & Co.) was laminated to a porous PTFE sheet through the introduction of enough heat to melt and attach the FEP sheet to the porous PTFE sheet as follows:

The combined sheets were first longitudinally stretched an amount 1.5:1 at a temperature of approximately 330° C. over a heated curved platen, and then further longitudinally stretched an amount 1.5:1 in a second heated zone at a temperature of approximately 340° C., thus forming a high strength composite film having a total amount of expansion of 2.25:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.7 mm (0.46 inch).

The result was a composite gasket material of the instant invention.

Tensile properties of high strength composite film prepared as described in Example 1 were tested as described above. Tensile strength was 19.87 MPa (2882 psi) and 2% secant tensile modulus was 589.7 MPa (85520 psi). The composite gasket material of Example 1 was tested by the Gasket Flow Test described above and the results shown in Table 1.

Example 2

A second example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous-expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 13.7 mm (0.54 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 13.3 mm (0.52 inch).

The result was a composite gasket material of the instant invention.

Tensile properties of high strength composite film prepared as described in Example 2 were tested as described above. Tensile strength was 173.7 MPa (25200 psi) and 2% secant tensile modulus was 5838 MPa (846700 psi). The composite gasket material of Example 2 was tested by the Gasket Flow Test described above and the results shown in Table 1.

Example 3

A third example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 20:1 in a second heated zone at a temperature of approximately 340° C., thus forming a high strength composite film having a total amount of expansion of about 76:1. The composite film was subsequently heated at a temperature of 335° C. in a third heated zone at a stretch ratio of 1:1 so that no additional expansion occurred.

Subsequently, the composite film was slit lengthwise and helically wrapped upon a core of polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.9 mm (0.47 inch).

The result was a composite gasket material of the instant invention.

Tensile properties of high strength composite film prepared as described in Example 3 were tested as described above. Tensile strength was 212.7 MPa (30850 psi) and 2% secant tensile modulus was 7212 MPa (1046000 psi). The composite gasket material of Example 3 was tested by the Gasket Flow Test described above and the results shown in Table 1.

Example 4

A fourth example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

The result was a composite gasket material of the instant invention.

Tensile properties of high strength composite film prepared as described in Example 4 were tested as described above. Tensile strength was 173.4 MPa (25200 psi) and 2% secant tensile modulus was 5838 MPa (846700 psi). The composite gasket material of Example 4 was tested by the Gasket Flow Test described above and the results shown in Table 1.

Comparative Example 1

For comparative purposes a section of commercially available wrapped porous polytetrafluoroethylene gasket material, Inertex ⅜" Valve Stem Packing, was obtained and tested as described in the examples above. A section of the tape wrapped around the core was unwound and samples were given the tensile test as described above except that the sample width was ½ inch. The results are also shown in Table 1.

TABLE 1

| Example | Film Tensile Strength (MPa) | Film Modulus @ 2% strain (MPa) | Gasket Flow (%) |
| --- | --- | --- | --- |
| 1 | 19.9 | 590 | 70 |
| 2 | 173.4 | 5838 | 15 |
| 3 | 212.7 | 7212 | 29 |
| 4 | 173.4 | 5838 | 40 |
| Comp. Ex. 1 | 6.6 | 79 | 137 |

As should be evident from the above examples, the basic film wrapped material of the present invention provides a very distinct improvement over PTFE sealing materials and thus can be effectively utilized as pre-formed loops, such as an O-ring groove flange sealing material.

The gasket material of the present invention provides significant improvements in the durability, longevity, chemical and thermal resistance, and ease in installation of gasket material for use in O-ring groove flanges. Another chief advantage of the present invention is its ability to provide a thick low creep, pure fluorocarbon sealant which can be formed into a variety of gasket shapes and sizes. This provides far more utility and flexibility over many previous fluorocarbon gaskets which required cutting from a sheet. While the present invention is somewhat similar to fluorocarbon joint sealant in its moldability, it has significantly better creep properties and higher maintained stresses with thick cross-section gaskets. As a pre-formed gasket, the present invention also eliminates positioning and mis-installation problems.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A gasket material for sealing a fluid connection in an apparatus, which gasket material comprises:

a core of elongated polytetrafluoroethylene (PTFE) formed into a loop;

means to constrain the core from lateral flow when the core is placed under compressive pressure to establish and maintain a fluid seal, the means comprising a film wrap around the PTFE core to form a sealant of sufficient strength to limit creep of the PTFE core when the gasket is placed under pressure.

2. The gasket material of claim 1 wherein the gasket material is tightly wrapped in a film of expanded PTFE.

3. The gasket material of claim 2 wherein the expanded PTFE film is coated with a layer of melt-processible thermoplastic fluoropolymer.

4. The gasket material of claim 1 wherein the gasket material is connected to itself to form a continuous ring.

5. The gasket material of claim 1 wherein the gasket material comprises a cord of material which can be cut to size and installed within the fluid connection.

6. The gasket material of claim 1 wherein the gasket material comprises a pre-shaped pattern adapted to be directly installed within the apparatus.

7. The gasket material of claim 1 wherein the gasket material includes an adhesive layer on at least one side to assist in retaining the gasket material in place within the apparatus.

8. The gasket material of claim 7 wherein the adhesive layer comprises a pressure sensitive adhesive.

9. The gasket material of claim 1 wherein the elongated PTFE core comprises expanded PTFE; and the film comprises expanded PTFE coated with a melt processible thermoplastic fluoropolymer.

10. The gasket material of claim 1 wherein the gasket material readily releases from the fluid connection after it has been fully compressed within it.

11. A process for sealing a fluid connection within an apparatus, which process comprises:

providing an O-ring gasket material comprising a core of elongated polytetrafluoroethylene (PTFE) and means to constrain the core from lateral flow when the core is placed under compressive pressure, the means comprising a film wrapped around the core of sufficient tensile strength to limit creep of the PTFE core when the gasket is placed under pressure;

attaching the gasket material within a flange of the apparatus;

applying pressure to compress the gasket and seal the fluid connection together, forming a fluid tight seal.

12. The process of claim 11 that further comprises providing a gasket material comprising a core of expanded PTFE wrapped in a film of expanded PTFE coated with a fluoropolymer.

13. The process of claim 11 that further comprises releasing the gasket material from the fluid connection after compression by prying the material loose, the gasket material separating intact from the fluid connection.

14. An O-ring gasket material for sealing a fluid connection; which gasket material comprises:

a core of elongated polytetrafluoroethylene (PTFE);

means to constrain the core from lateral flow when the core is placed under compressive pressure to establish and maintain a fluid seal, the means comprising a tight film wrap around the PTFE core of sufficient tensile strength to limit creep of the PTFE core when the gasket is placed under pressure.

15. The gasket material of claim 14 wherein the gasket material includes an adhesive layer on at least one side to assist in retaining the gasket material in place on a plate.

16. The gasket material of claim 15 wherein the adhesive layer comprises a releasable coating of pressure sensitive adhesive.

17. The gasket material of claim 14 wherein the elongated PTFE core comprises an expanded PTFE;

and the film comprises expanded PTFE coated in a melt processible thermoplastic fluoropolymer.

18. The gasket material of claim 17 wherein the gasket material readily releases from the fluid connection after it has been fully compressed against it.

19. The gasket of material of claim 14 wherein the gasket material is pre-densified prior to mounting to limit the amount of compression required to establish a seal.

* * * * *

UNITED STATES PATENT AND TRADEMARK OFFICE
CERTIFICATE OF CORRECTION

PATENT NO. : 5,492,336
DATED : February 20, 1996
INVENTOR(S) : Barna et al.

It is certified that error appears in the above-identified patent and that said Letters Patent is hereby corrected as shown below:

Col. 2, line 55: change "Gore-TEX\" to —Gore-Tex®—.
Col. 4, line 52: delete "lo".
Col. 5, line 67: delete "lo".
Col. 6, line 41: delete "lo". : delete "lo".
Col. 7, line 14: delete "lo".
Col. 8, line 11: delete the second period.
Col. 8, line 31: delete "lo".
Col. 10, line 15: correct equation to:

$$GF, \text{percent} = (P_f - P_i / P_i) \times 100$$

Col. 11, line 24: change "porous-expanded" to – porous expanded".

Signed and Sealed this

Seventeenth Day of February, 1998

*Attest:*

BRUCE LEHMAN

*Attesting Officer*     *Commissioner of Patents and Trademarks*